United States Patent

Morse

[11] 3,861,662
[45] Jan. 21, 1975

[54] COMBINED DOOR CARRIER AND HANGING DEVICE

[76] Inventor: Carl W. Morse, 4301 S.W. 109 St., Miami, Fla. 33165

[22] Filed: Dec. 10, 1973

[21] Appl. No.: 423,541

[52] U.S. Cl. ................ 269/17, 269/152, 269/321 F
[51] Int. Cl. ............................................. B25h 1/08
[58] Field of Search ......... 269/17, 55, 321 F, 321.5, 269/152; 214/1 D

[56] References Cited
UNITED STATES PATENTS

| | | | |
|---|---|---|---|
| 2,503,388 | 4/1950 | Hedlund | 214/1 D |
| 2,908,403 | 10/1959 | Browder, Jr. et al. | 269/17 |

Primary Examiner—Granville Y. Custer, Jr.
Assistant Examiner—Neil Abrams
Attorney, Agent, or Firm—Salvatore G. Militana

[57] ABSTRACT

A combined door carrier and hanging device adapted to support a door panel vertically with the hinged edge of the door in a horizontal and upper position to permit a person to prepare the door for hanging. The device consists of a pair of support members joined together by an elongated tubular member and adjustable clamp members mounted on each of the support members for gripping the lower edge of the door panel and maintaining the panel in a vertical position while the person works on the door panel. One of the support members is provided with floor engaging wheels to permit the device to be tilted and wheeled to the opening where the door is to be hung. The device with the panel thereon is then swung to a vertical position to place the edge of the door panel adjacent the door frame where the door hinges are to be mounted. Upon placing blocks of desired thickness, if needed, beneath the door panel, the door can then be hung quickly and efficiently.

3 Claims, 4 Drawing Figures

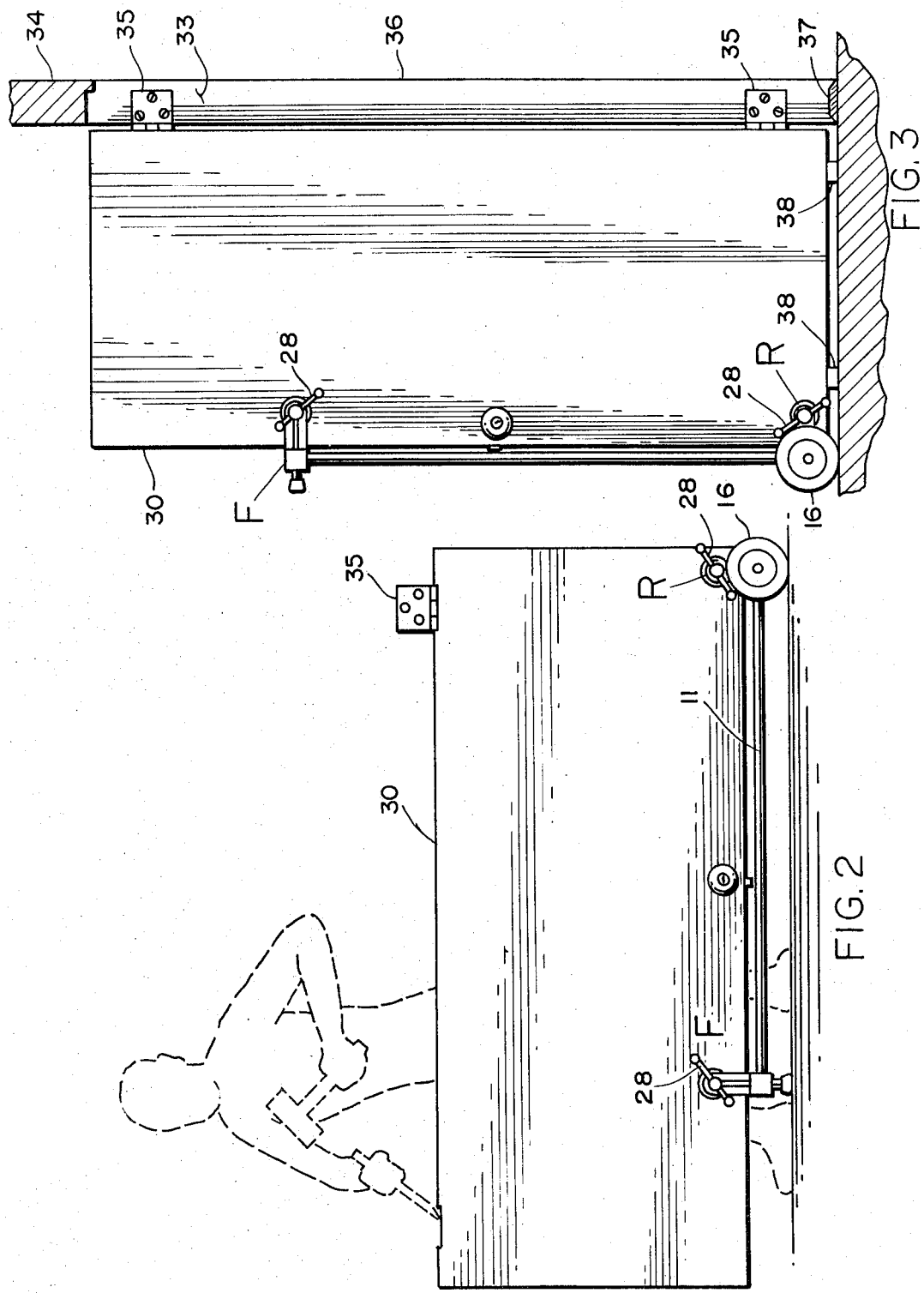

COMBINED DOOR CARRIER AND HANGING DEVICE

BACKGROUND OF THE INVENTION

1. Field of the Invention

This invention is directed to a device for mounting a door panel thereon for supporting the door panel as a person readies the door panel for hanging as well as for carrying the door panel to the place where it is to be hung and to maintain the door panel in position at the opening while the door is being hung.

2. Description of the Prior Art

At the present time there is no single device which produces all of the following desired functions for a carpenter who is employed to hang doors:

1. Support the door panel as while being prepared for hanging such as planing the edges of the door panel in order to properly fit the opening in which it is intended and to place the hinges thereon.
2. To carry the door panel to the place where it is to be hung.
3. To maintain the door panel in position at the opening as the hinge recesses are made in the door frame and the hinges fastened thereon.

The manner in which the carpenters presently fit and hang doors consists in merely leaning the door panel against a horse or the like, to permit mounting the hinges in place on the door panel, then carrying the door panel bodily to the opening and hold the door in place at the opening to mark the position of the hinges on the door frame. After the hinge recesses have been cut, the carpenter then places blocks beneath the door panel to provide clearance above the floor, holding the door with one hand as he fastens the hinges in place with screws. As can be readily noted, this manner of hanging doors is laborious, time consuming and one which results in invariably misfitting of door panels. It is quite difficult for one person to hang a door quickly and properly when he is unassisted.

However, with the use of my combined door carrier and hanging device, all of the above objections to a single person hanging a door is obviated.

SUMMARY OF THE INVENTION

Therefore, a principal object of the present invention is to provide a device for supporting, carrying and hanging a door that permits a single person to perform these functions easily, quickly and efficiently.

Another object of the present invention is to provide a combined door carrier and hanging device which is simple in construction, readily handled by a single person and permits the person to hang the door in an opening quickly and properly.

A further object of the present invention is to provide a combined door carrier and hanging device that is a wheeled support that maintains the door panel in a vertical position to permit a carpenter to prepare the door for hanging, permits the wheeling of the door panel to the opening where it is to be hung and then supports the door panel at the opening in its proper position as the hinges are fastened to the door frame.

With these and other objects in view, the invention will be best understood from a consideration of the following detailed description taken in connection with the accompanying drawings forming a part of this specification, with the understanding, however, that the invention is not confined to any strict conformity with the showing of the drawings but may be changed or modified so long as such changes or modifications mark no material departure from the salient features of the invention as expressed in the appended claims.

BRIEF DESCRIPTION OF THE DRAWINGS

In The Drawings:

FIG. 2 is a side elevational view showing a door mounted on my device to permit the carrying and supporting the door while a workman prepares a door for mounting.

FIG. 3 is a similar view illustrating the manner of hanging the door at an opening in a wall shown in section.

DESCRIPTION OF THE PREFERRED EMBODIMENT

Figure 1:
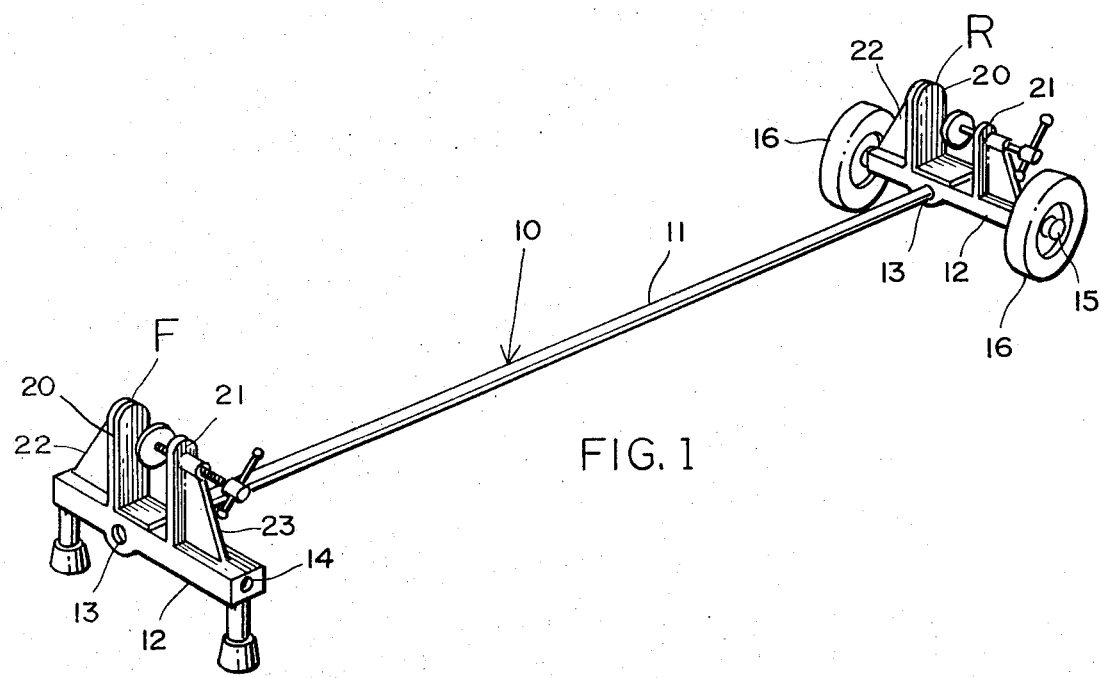
FIG. 1 is a perspective view of a combined door carrier and hanging device constructed in accordance with my invention.
Figure 4:
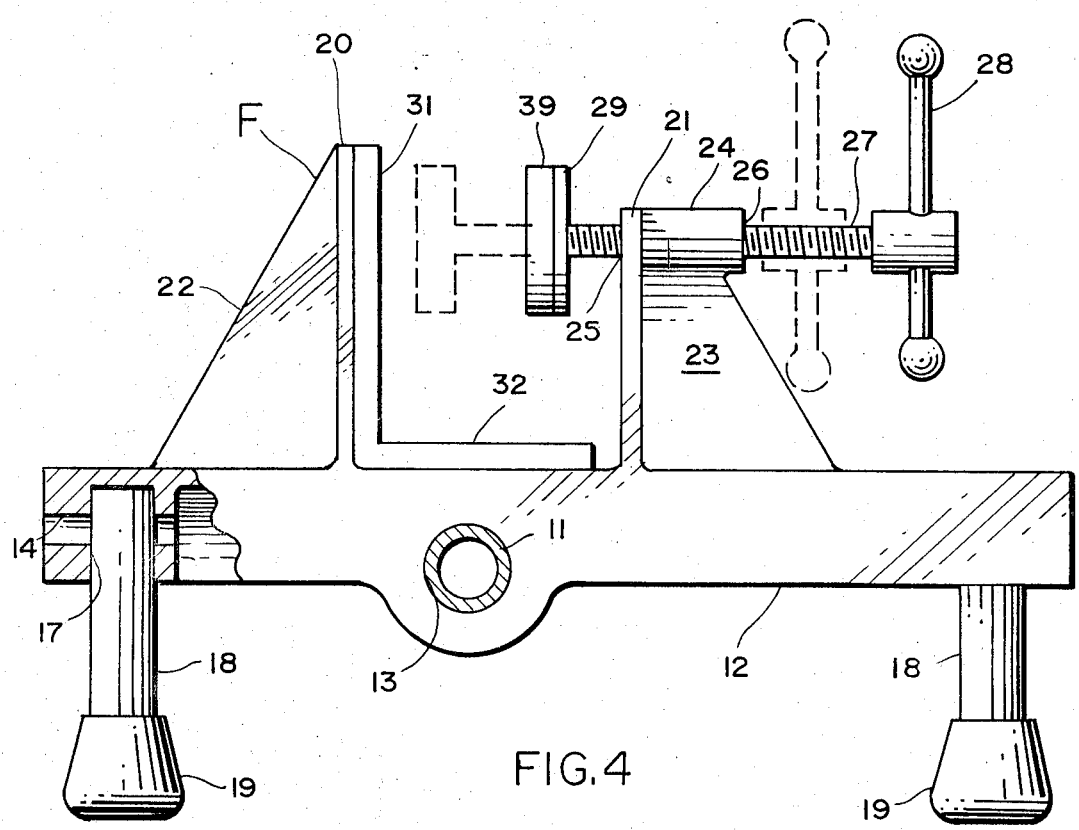
FIG. 4 is an end elevational view partially broken away.

Referring to the drawings wherein like numerals are used to designate similar parts throughout the several views, the numeral 10 refers to my combined door carrier and hanging device consisting of a front support member -F- and a rear support member -R- joined together by an elongated tubular member 11.

Both the front and rear support members are provided with identical castings for supporting a clamp device consisting of a base member 12 having bores 13 and 14 extending throughout the base member 12 and at right angle to each other. The bore 14 extends along the longitudinal axis of the base member 12 while the bore 13 is coplanar with the bore 14 and receive the ends of the tubular member 11. The bore 14 of the rear support member -R- receives an axle 15 for supporting wheels 16 that permit the rolling of my device 10 along the floor as explained in detail hereinafter. The front support member -F- is further provided with a pair of vertically disposed bores 17 adjacent of the ends of the base member 12 for receiving legs 18 for supporting the device 10. Rubber members 19 are mounted over the free ends of the legs 18 to prevent the legs 18 from defacing a floor or from moving about inadvertently on the floor while a person is preparing the door 30 prior to hanging same.

Each of the support members -F- and -R- is provided with a pair of upstanding arm portions 20 and 21 extending upwardly of the base member 12 and in spaced relation to each other. Both arm portions 20, 21 are rigidly supported by cross braces 22, 23 respectively with a threaded tubular member 24 secured to the top of the cross brace 23. An opening 25 in the arm portion 21 in alignment with the threaded bore 26 of the tubular member 24 receives a threaded stem 27. On one end of the threaded stem 27 is a handle 28 and on the other end is a padded plate 29 on which a soft material 39 is affixed to engage the side wall of a door 30. Also on the inner surface of the arm portion 20 and the upper surface of the base members 12 are pads 31 and 32 that likewise engage the surfaces of the door 30 that rest on the front and rear support members -F- and -R- to prevent scratching or in any way marring the surfaces of the door 30.

In the normal use of my door carrying and hanging device 10, a person such as a carpenter about to hang the door in an opening 33 in a wall 34 places a door panel 30 on the device 10 which is lying horizontally on the floor. The door panel 30 will rest on the paddings 32 and engage the pads 31 and 39 as the handles 28 are then rotated to tighten the plates 29 against the door 30 so that the door 30 is held securely in a vertical position as shown by FIG. 2. The carpenter can then work on the door 30 to plane the edge of the door 30 if the latter does not fit and also to mount the hinges 35 thereon in preparation for the hanging of the door 30.

The carpenter then tilts the door 30 with the device 10 attached thereto by lifting the left end of the door 30 as viewed in FIG. 2 allowing the device 10 to rest on the floor at the wheels 16 alone. My device 10 and the door panel 30 may now be wheeled to the place at which the door is to be hung. There he tilts the device 10 to an upright position to place the hinged edge of the door adjacent the door frame 36 on which the hinges 35 are to be attached. Since the door 30 must set a certain distance above the floor in order to clear the threshhold, blocks or wedges 38 of the desired height are placed between the floor and the lower edge of the door panel 30. The device 10 is then rolled on its wheels 16 toward the opening 33 until the side edge of the door 30 is properly positioned next to the door frame 36. The position of the hinge plates 35 are then marked on the door frame 36 and the latter is chiselled to form a recess that is to receive each of the hinge plates 35. The hinges 35 are then fastened in place with screws to complete the hanging of the door 30.

It is readily noted that by the use of my combined door carrier and hanging device 10 the work of handling a door panel, mounting the hinges, etc. on the door, carrying the door to the opening in which the door is to be mounted and the hanging of the door in place has been simplified, made readily convenient to the carpenter and reduced the amount of time to accomplish this work at a minimum of effort on the part of the carpenter. Also, my device 10 simplifies the hanging of the door in an opening 20 that the chance of error in the mounting of the hinges is minimized thereby resulting in lower labor costs.

What I claim as new and desire to secure by Letters Patent of the United States is:

1. A combined door carrier and hanging device comprising a substantially elongated member, support members mounted on the ends of said elongated member, a plurality of floor engaging foot members mounted on one of said support members for maintaining said elongated member in spaced relation to the floor, an axle mounted on the other of said support members, floor engaging wheels mounted on said axle for maintaining said elongated member in substantially parallel relation with said floor, clamping means mounted on said support members adapted to engage a door positioned on said elongated member, said wheels extending beyond said other of said support members to permit the wheeling of said door along said floor and upon the swinging of said elongated member about said wheels to a substantially vertical position, the lower edge of said door will be positioned a predetermined distance above said floor to permit mounting said door.

2. The structure as recited by claim 1 wherein each of said support members comprise a base member, a pair of upstanding members mounted in spaced relation on said base member, a threaded bore extending through one of said upstanding members and said clamping means comprise a threaded stem received by said bore, a handle mounted on one end of said threaded stem and a plate member mounted on the other end of said threaded stem and adapted to engage the side wall of said panel and maintain said panel in a vertical position.

3. The structure as recited by claim 2 taken in combination with pliable members mounted on said plate members and that portion of said base members and the other of said upstanding members that engage said door panel.

* * * * *